United States Patent
Nelson et al.

(10) Patent No.: US 9,864,344 B2
(45) Date of Patent: Jan. 9, 2018

(54) SYSTEM AND METHOD FOR MULTIPLE SWEEP PROXIMITY SENSING AND CONTROL

(71) Applicants: Chris Nelson, Harrisburg, SD (US); Bill Witt, Harrisburg, SD (US)

(72) Inventors: Chris Nelson, Harrisburg, SD (US); Bill Witt, Harrisburg, SD (US)

(73) Assignee: Sioux Steel Company, Sioux Falls, SD (US)

( * ) Notice: Subject to any disclaimer, the term of this patent is extended or adjusted under 35 U.S.C. 154(b) by 614 days.

(21) Appl. No.: 14/514,494

(22) Filed: Oct. 15, 2014

(65) Prior Publication Data

US 2015/0105915 A1    Apr. 16, 2015

Related U.S. Application Data

(60) Provisional application No. 61/891,549, filed on Oct. 16, 2013.

(51) Int. Cl.
*G01M 1/38* (2006.01)
*G05B 11/01* (2006.01)

(52) U.S. Cl.
CPC .................... *G05B 11/01* (2013.01)

(58) Field of Classification Search
CPC ..................................... G05B 11/01
USPC .................... 700/95–111, 179–195
See application file for complete search history.

(56) References Cited

U.S. PATENT DOCUMENTS

| | | |
|---|---|---|
| 822,547 A | 6/1906 | Nicolson |
| 2,646,023 A | 7/1953 | Virgil |
| 2,763,362 A | 9/1956 | Greaves |
| 2,801,137 A | 7/1957 | Clay |
| 3,014,575 A | 12/1961 | Klein |
| 3,035,718 A | 5/1962 | Behlen |
| 3,065,996 A | 11/1962 | Patz |
| 3,067,914 A | 12/1962 | Ellaby |
| 3,175,676 A | 3/1965 | Schaff |
| 3,181,715 A | 5/1965 | Olson |
| 3,204,786 A | 9/1965 | Kucera |

(Continued)

FOREIGN PATENT DOCUMENTS

| | | |
|---|---|---|
| CA | 2312068 | 12/2001 |
| FR | 1032110 | 6/1953 |

(Continued)

OTHER PUBLICATIONS

Wen-Bin Du,Qun Fang, Qiao-Hong He, and, and Zhao-Lun Fang. "High-Throughput Nanoliter Sample Introduction Microfluidic Chip-Based Flow Injection Analysis System with Gravity-Driven Flows", Analytical Chemistry 2005 77 (5), pp. 1330-1337.*

(Continued)

*Primary Examiner* — Satish Rampuria

(74) *Attorney, Agent, or Firm* — Jeffrey A. Proehl; Woods, Fuller Shultz & Smith, P.C.

(57) ABSTRACT

A bin sweep system for a bin which may comprise at least two sweeps independently rotatable about a center of the bin, an alignment detecting apparatus for monitoring a relative position of a first one of the sweeps with respect to a second one of the sweeps, and an operational control device configured to selectively discontinue and resume operation of at least one of the sweeps to move the sweeps toward a maximum separation condition.

14 Claims, 15 Drawing Sheets

(56) References Cited

U.S. PATENT DOCUMENTS

| | | | |
|---|---|---|---|
| 3,228,514 A | 1/1966 | Kucera | |
| 3,229,665 A | 1/1966 | Baltz | |
| 3,229,827 A | 1/1966 | Kucera | |
| 3,231,106 A | 1/1966 | Bruecker | |
| 3,291,325 A | 12/1966 | Henningson | |
| 3,297,146 A | 1/1967 | Munger | |
| 3,338,636 A | 8/1967 | Chapman | |
| 3,438,517 A | 4/1969 | Steffen | |
| 3,451,567 A | 6/1969 | Laidig | |
| 3,455,470 A | 7/1969 | Kanagy | |
| 3,472,357 A | 10/1969 | Strocker | |
| 3,486,643 A | 12/1969 | Smith | |
| 3,532,232 A * | 10/1970 | Sukup | A01F 25/20 414/287 |
| 3,647,094 A | 3/1972 | Jackson | |
| 3,828,916 A | 8/1974 | Patz | |
| 3,838,780 A | 10/1974 | Ridlehuber | |
| 3,908,840 A | 9/1975 | Lambert | |
| 3,946,496 A * | 3/1976 | Sukup | F26B 25/22 34/575 |
| 3,946,861 A | 3/1976 | Sandefur | |
| 3,974,908 A | 8/1976 | Keichinger | |
| 3,986,600 A | 10/1976 | Pentith | |
| 4,022,335 A | 5/1977 | Lambert | |
| RE29,309 E | 7/1977 | Patterson | |
| 4,057,151 A | 11/1977 | Weaver | |
| 4,230,222 A | 10/1980 | Clark | |
| 4,242,028 A | 12/1980 | Van Dusen | |
| 4,313,705 A | 2/1982 | Jackson | |
| 4,329,105 A | 5/1982 | Buschbom | |
| 4,451,192 A | 5/1984 | Wood | |
| 4,516,898 A | 5/1985 | Cantenot | |
| 4,583,903 A | 4/1986 | Hutchison | |
| 4,619,330 A | 10/1986 | MacHnee | |
| 4,619,577 A | 10/1986 | Swanson | |
| 4,621,968 A | 11/1986 | Hutchison | |
| 4,655,666 A | 4/1987 | Cantenot | |
| 4,658,911 A | 4/1987 | Drever | |
| 4,669,941 A | 6/1987 | West | |
| 4,762,220 A | 8/1988 | Lutke | |
| 4,773,808 A | 9/1988 | Fischer | |
| 4,775,278 A | 10/1988 | Fischer | |
| 4,824,312 A | 4/1989 | Schiltz | |
| 4,875,820 A | 10/1989 | Lepp | |
| 4,998,855 A | 3/1991 | Tschernatsch | |
| 5,088,871 A | 2/1992 | Mellish | |
| 5,099,983 A | 3/1992 | Valdez | |
| 5,186,596 A | 2/1993 | Boucher | |
| 5,203,802 A | 4/1993 | Denis | |
| 5,540,533 A | 7/1996 | Eskelinen | |
| 5,639,200 A | 6/1997 | Jiskoot | |
| 5,769,590 A | 6/1998 | Weikel | |
| 5,788,055 A | 8/1998 | Stewart | |
| 6,017,180 A | 1/2000 | Wilham | |
| 6,039,647 A | 3/2000 | Weikel | |
| 6,203,261 B1 | 3/2001 | South | |
| 6,254,329 B1 | 7/2001 | Sukup | |
| 6,280,331 B1 | 8/2001 | Tuttlebee | |
| 6,281,610 B1 | 8/2001 | Kliman | |
| 6,499,930 B1 | 12/2002 | Dixon | |
| 6,640,451 B1 | 11/2003 | Vinarcik | |
| 6,948,902 B2 | 9/2005 | Hanig | |
| 7,210,538 B2 | 5/2007 | Gust | |
| 7,544,031 B2 | 6/2009 | Kaeb | |
| 7,588,405 B2 | 9/2009 | Johnson | |
| 7,967,542 B2 | 6/2011 | Epp | |
| 8,657,025 B2 | 2/2014 | Thompson | |
| 8,770,388 B1 | 7/2014 | Chaon | |
| 2004/0146381 A1 | 7/2004 | Hanson | |
| 2004/0213650 A1 * | 10/2004 | Epp | B65G 65/466 414/310 |
| 2005/0254922 A1 | 11/2005 | Berraeu | |
| 2005/0263372 A1 | 12/2005 | Hollander | |
| 2006/0245864 A1 | 11/2006 | Epp | |
| 2006/0285942 A1 | 12/2006 | Fridgen | |
| 2009/0041566 A1 * | 2/2009 | Lambertini | A01F 25/2027 414/526 |
| 2010/0239399 A1 * | 9/2010 | Hoogestraat | B65G 65/466 414/310 |
| 2013/0064629 A1 | 3/2013 | Schuelke | |
| 2013/0216341 A1 | 8/2013 | Luster | |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

OTHER PUBLICATIONS

Jayas, Digvir S., and Noel DG White. "Storage and drying of grain in Canada: low cost approaches." Food control 14.4 (2003): pp. 255-261.*

Sudenga Industries, Inc., Press Release, Nov. 1, 2004, pp. 1-3.

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.

* cited by examiner

SYSTEM AND METHOD FOR MULTIPLE SWEEP PROXIMITY SENSING AND CONTROL

REFERENCE TO RELATED APPLICATIONS

This application claims the priority of U.S. Provisional Patent Application No. 61/891,549, filed Oct. 16, 2013, which is hereby incorporated by reference in its entirety.

BACKGROUND

Field

The present disclosure relates to bin sweep systems and more particularly pertains to a new system and method for multiple sweep proximity sensing and control to permit relatively independent movement of multiple sweeps with respect to each other.

SUMMARY

The present disclosure relates to a bin sweep system for a bin which may comprise at least two sweeps independently rotatable about a center of the bin, an alignment detecting apparatus for monitoring a relative position of a first one of the sweeps with respect to a second one of the sweeps, and an operational control device configured to selectively discontinue and resume operation of at least one of the sweeps to move the sweeps toward a maximum separation condition.

Another aspect of the disclosure relates to a bin sweep system for a bin having a floor surface and a substantially central well. The system may comprise a center post located at approximately a center of the bin, and at least two sweeps configured to rotate generally independently about the center post. The at least two sweeps may include a first sweep with a first longitudinal axis and a second sweep with a second longitudinal axis. At least the second sweep may have an operational zone with respect to the first sweep, with the operational zone being bounded by a first outer position of the second sweep with respect to the first sweep and a second outer position of the second sweep with respect to the first sweep. An alignment detecting apparatus may be configured to monitor a relative position of the second sweep with respect to the operational zone. An operational control device may be in communication with the alignment detecting apparatus and being configured to discontinue movement of at least one of the sweeps when the second sweep is located outside of the operational zone.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
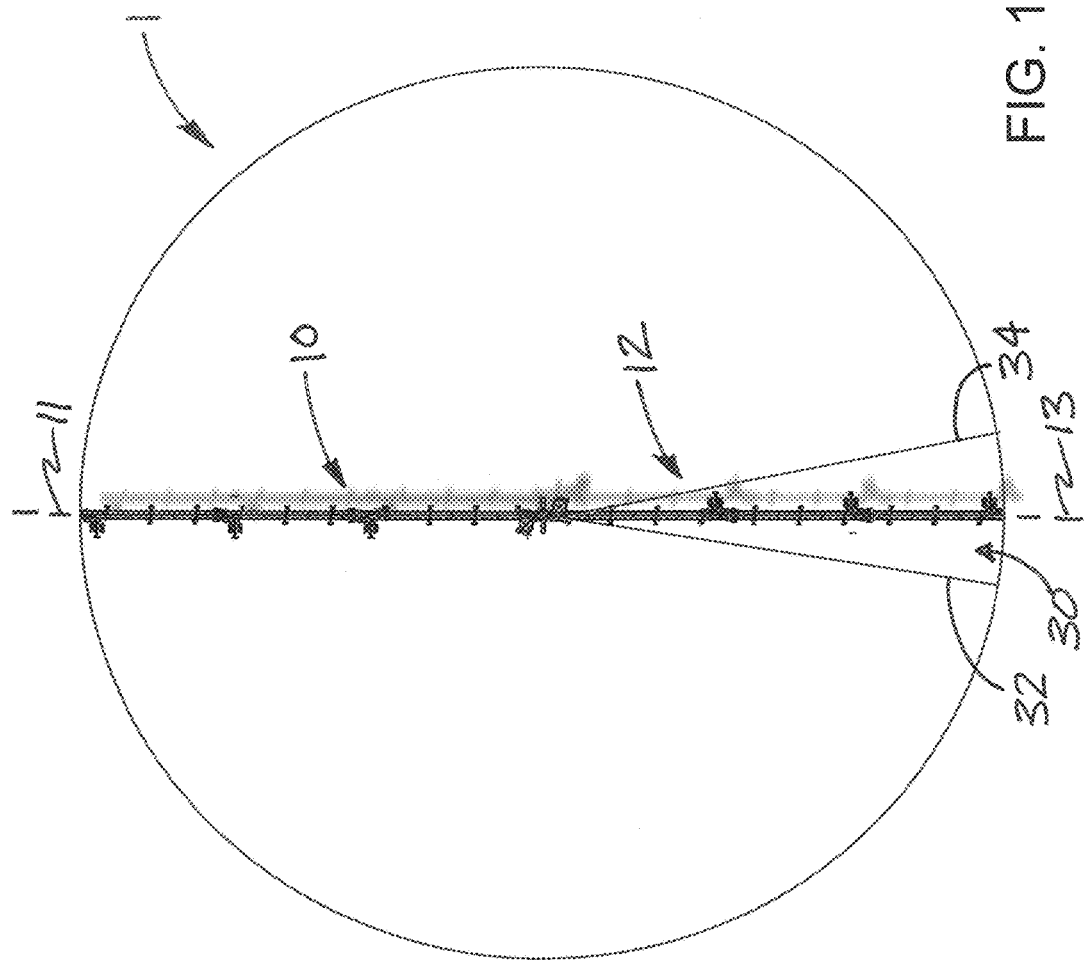
FIG. 1 is a schematic top view of a bin sweep system of the disclosure with an overlay showing the swept area as well as the relative operational zone of a follower sweep with respect to a reference sweep, according to the present disclosure.

With reference now to the drawings, and in particular to FIGS. 1 through 15 thereof, a new system and method for multiple sweep proximity sensing and control embodying the principles and concepts of the disclosed subject matter will be described.

The use of multiple bin sweeps to remove grain or other particulate material is highly useful to remove the material from the interior of the bin in a faster manner relative to a single bin sweep. Bin sweeps may utilize different technologies for moving the material, including, for example, augers and paddles, although other technologies may also be used. In multiple bin sweep installations, the sweeps may be rigidly connected together so that the sweeps move at an equal pace of movement about the bin and at equal angles therebetween. Applicant has recognized that the individual sweeps may encounter different conditions inside the bin which tend to impede forward movement of the sweeps differently. If the forward movement of the sweeps is resisted unequally, a high level of stress may develop in the structure connecting the sweeps together and may lead to damage or failure of the connecting structure. Further, if one sweep is being held back by the other, then the drive mechanism for the hindered sweep may be unduly strained. In other installations, the sweeps may not be constrained to move together by connecting structure, but may run into each other if one sweep is able to maintain a pace of movement that is greater than the other or others and may cause an even greater degree of damage to the sweeps. Further, maintaining uniform spacing of the sweeps can help distribute the stress placed upon bin walls by the grain remaining in the bin interior.

In one aspect, the disclosure relates to a bin sweep system 1 for use in removing grain or other particulate materials from a bin having a floor surface 2 on which the particulate matter rests, and side walls extending upwardly from a perimeter of the floor surface to hold the material in the interior of the bin. The bin also typically has a central well 3 extending downwardly through the floor surface and toward which the material is generally moved so that an auger or other conveyance device, which is in communication with the well and typically positioned below the floor surface, is able to move the material to a location exterior of the bin. The manner in which the material is removed once it has reached the well is not a critical aspect of the system.

The sweep system 1 may also include a center post 4 that may extend upwardly from the floor surface of the bin and may be positioned adjacent to or above the well. The center post may form a common center about which the sweeps move and rotate. The system 1 may further include at least two sweeps 10, 12 rotating about the common center of the bin, and illustratively the disclosure will describe a system with two sweeps although additional sweeps may be utilized. The sweeps may be rotatably connected together to rotate about the common center, and typically this is accomplished by rotatably connecting the sweeps to the center post. The sweeps 10, 12 may be movable about the common center independently of each other, such as not having a physical linkage between the sweeps that forces the sweeps to move at the same pace or speed. In other words, the sweeps may not be connected together in a manner so that movement by one sweep requires movement by another sweep, or causes movement by the other sweep. Each of the sweeps may be elongated with a longitudinal axis 11, 13 that generally extends from an inboard end of the sweep to an outboard end of the sweep. For ease of description, one of the sweeps will be referred to as a first sweep 10 and one of the sweeps will be referred to as a second sweep 12

Each of the sweeps 10, 12 may including a frame 14, 15 which may in turn comprise a housing, and a collar 16, 17 positioned on or about the center post 4. The collars may each have an upper surface, a circumferential surface, and a bottom surface, although these features are not critical. The first sweep may have a first collar 16 and the second sweep may have a second collar 17. The first collar 16 may be positioned on the center post 4 above the second collar 17, with the second collar being positioned substantially adjacent to the first collar. Each of the sweeps may also have at least one connecting arm extending from the collar to the frame and the connecting arm or arms may be connected to the collar and to the frame to restrict movement of the frame to a substantially circular movement path about the center post on which the collar is mounted. In some embodiments, a pair of connecting arms 24, 26 and 25, 27 may be employed, and each of the connecting arms may be positioned on an opposite side of the post and may be mounted on an opposite locations on the collar. Optionally, an effective length of the connecting arms between the collar and the frame may be adjustable.

A first support 28 may be mounted on the first sweep 10 to move with the first sweep, and may be rotatable with the first sweep with respect to the center post. The first support 28 may be mounted on the first collar or the connecting arm or arms of the first sweep. A second support 29 may be mounted on the second sweep 12 to move with the second sweep, and may be rotatable with the second sweep with respect to the center post. The second support may be mounted on the second collar or the connecting arm or arms of the second sweep.

The sweeps of the system 1 may have a condition in which the sweeps have the maximum separation, such as a maximum separation angle, between the sweeps, and thus the maximum separation may be determined by the number of sweeps utilized in the system. For example, in a system with only two sweeps, the maximum separation angle may be approximately 180 degrees, and in a system having three sweeps, the maximum angular separation may be approximately 120 degrees, and in a system with only four sweeps, the maximum angular separation may be approximately 90 degrees, and so on. In the maximum separation condition the sweeps have the least likelihood of colliding with each other while each having approximately the same area of the bin floor to clear. It is therefore desirable to maintain the maximum separation condition between the sweeps at all times with only relatively small or slight deviations from the maximum angular separation. An acceptable or allowable degree of deviation, or maximum deviation angle, from the maximum separation angle may define an operational zone for the orientation of one sweep with respect to another one of the sweeps.

A reference sweep and a follower sweep may thus be in the maximum separation condition when the follower sweep is located in the operational zone 30 (such as depicted in FIG. 1) with respect to the reference sweep, and the operational zone may be bounded by a first outer position 32 of the follower sweep with respect to the reference sweep and a second outer position 34 of the follower sweep with respect to the reference sweep. The first outer position of the follower sweep may be defined by rotating the orientation of the follower sweep with respect to the reference sweep by a maximum deviation angle in a clockwise direction. The second outer position of the follower sweep may be defined by rotating the orientation of the follower sweep with respect to the reference sweep by a maximum deviation angle in a counter-clockwise direction. The operational zone 30 may extend to the maximum deviation angle on either side of the line 36 of the maximum separation angle, and the number of degrees to which the zone extends on either side of the maximum separation angle may be equal, so the zone is substantially symmetrical about the line of the maximum separation angle, although such symmetry is not required and the degree measurement of the first and second outer positions may vary.

Figure 2:
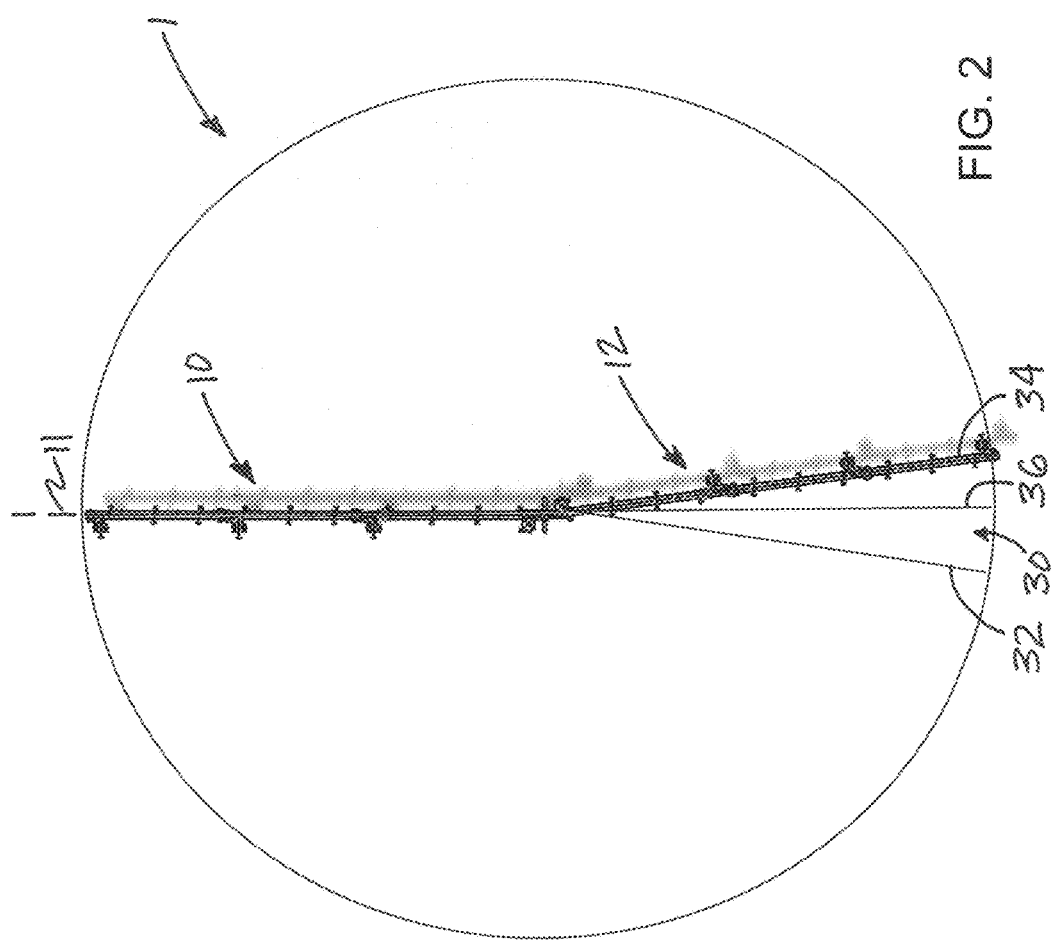
FIG. 2 is a schematic top view of the bin sweep system and overlay with the follower (second) sweep lagging behind the reference (first) sweep, according to an illustrative embodiment.
Figure 3:
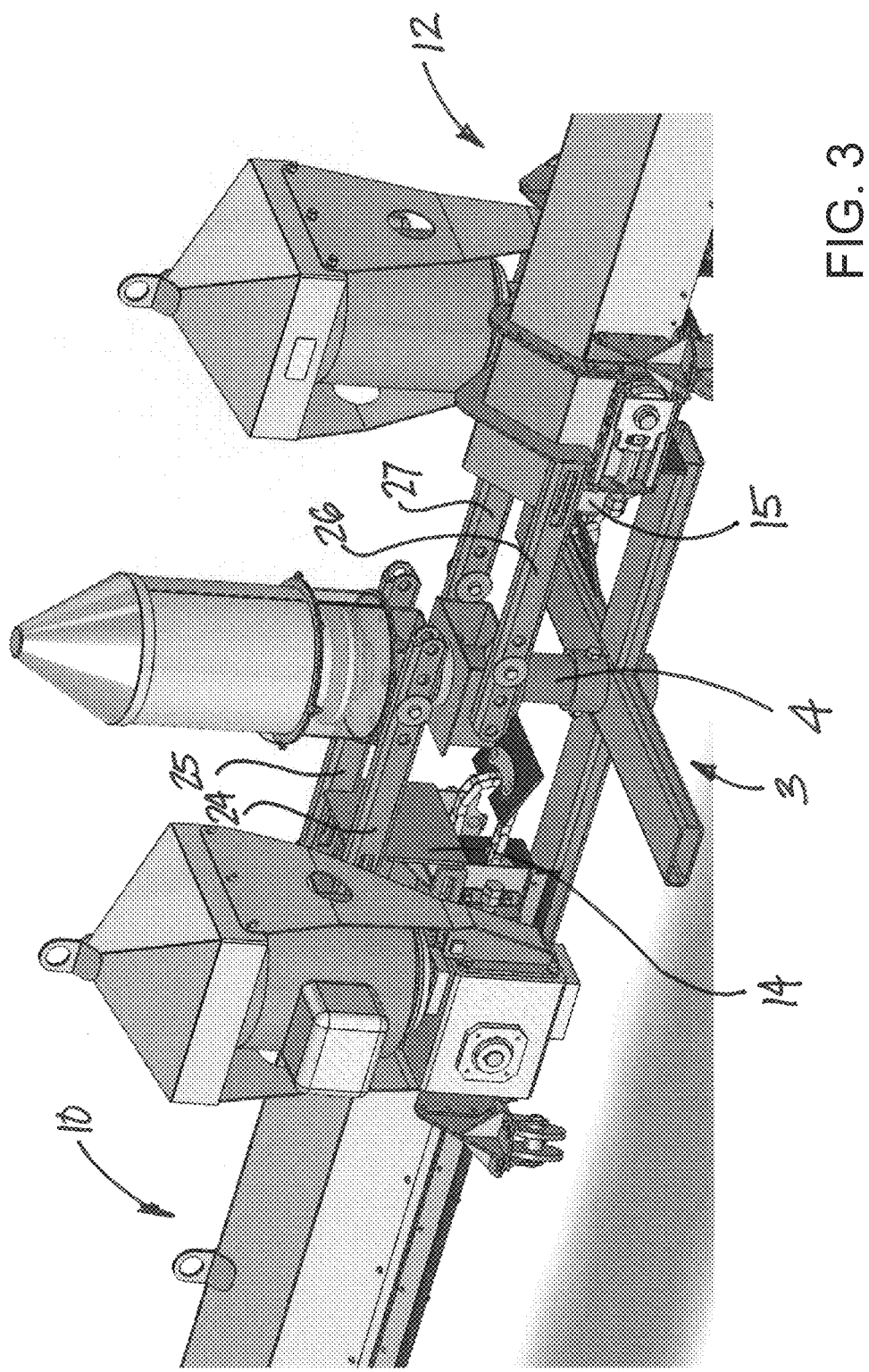
FIG. 3 is a schematic perspective view of the common center of the sweeps with the center post and connecting structure connecting the sweeps to the center post, according to an illustrative embodiment.
Figure 4:
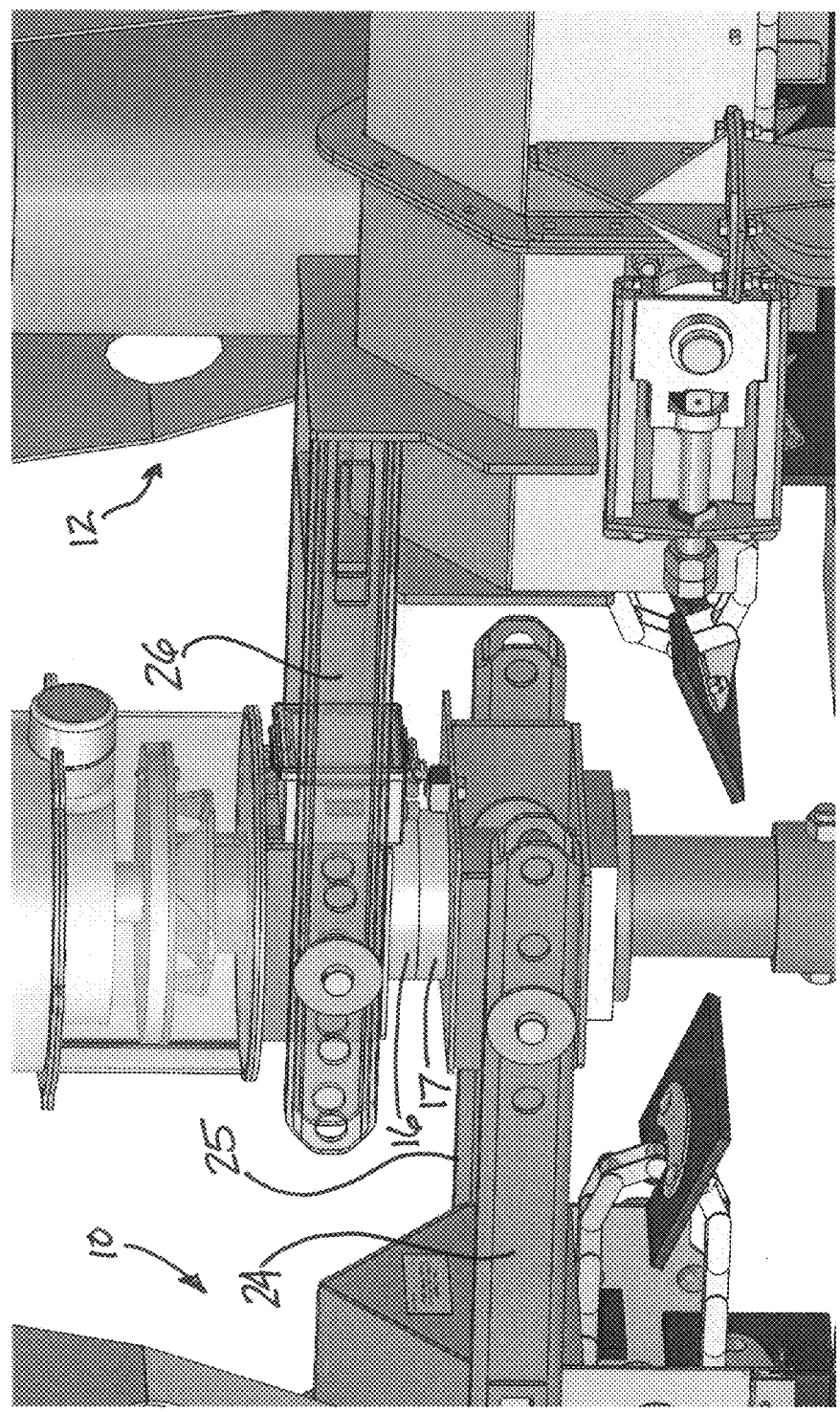
FIG. 4 is a schematic enlarged view of the central portions of the bin sweep system, according to an illustrative embodiment.
Figure 5:
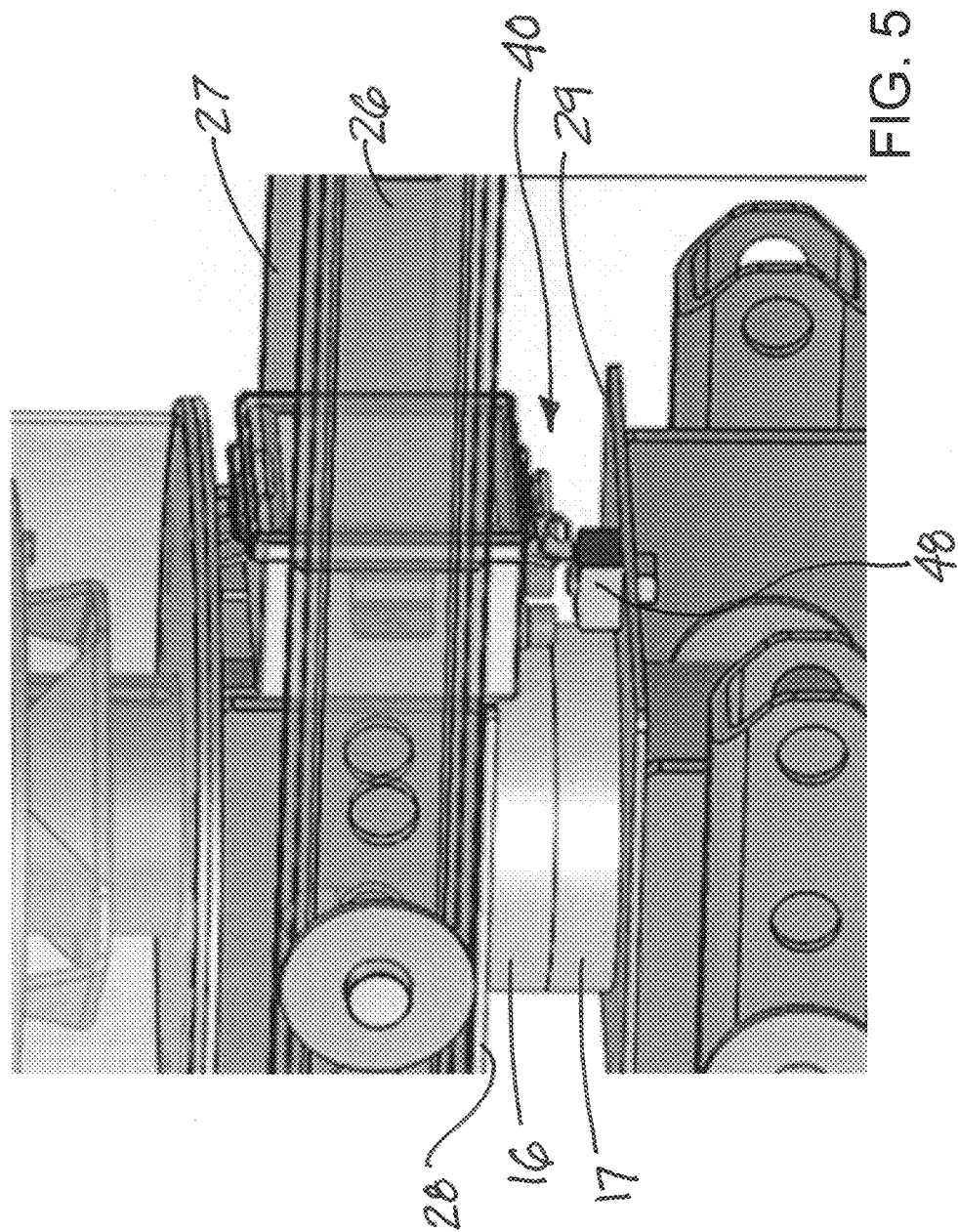
FIG. 5 is a schematic further enlarged view of the central portions of the bin sweep system to show elements of the alignment detecting apparatus, according to an illustrative embodiment.
Figure 6:
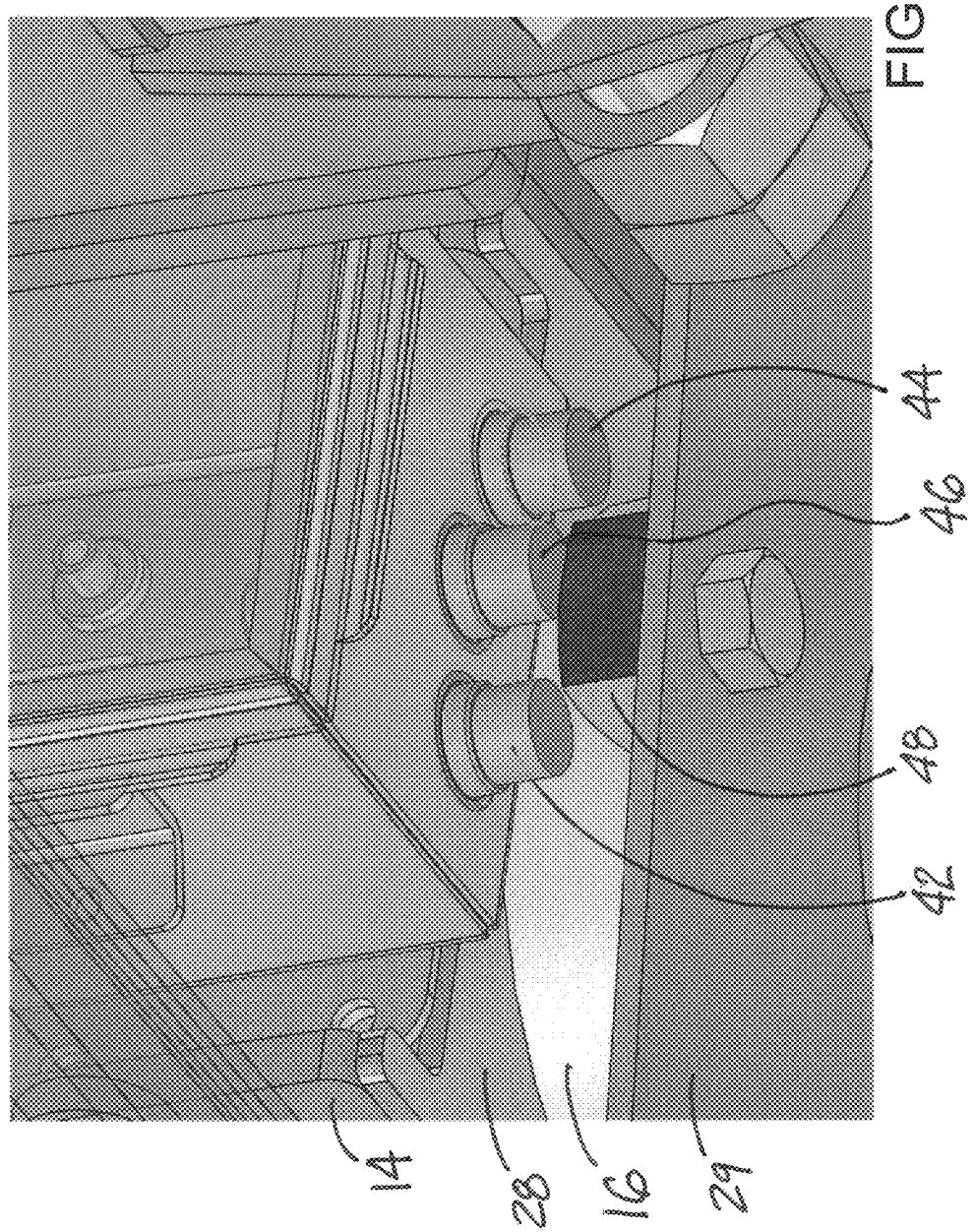
FIG. 6 is a schematic perspective view of the alignment detecting apparatus mounted on the sweeps, according to an illustrative embodiment.
Figure 7:
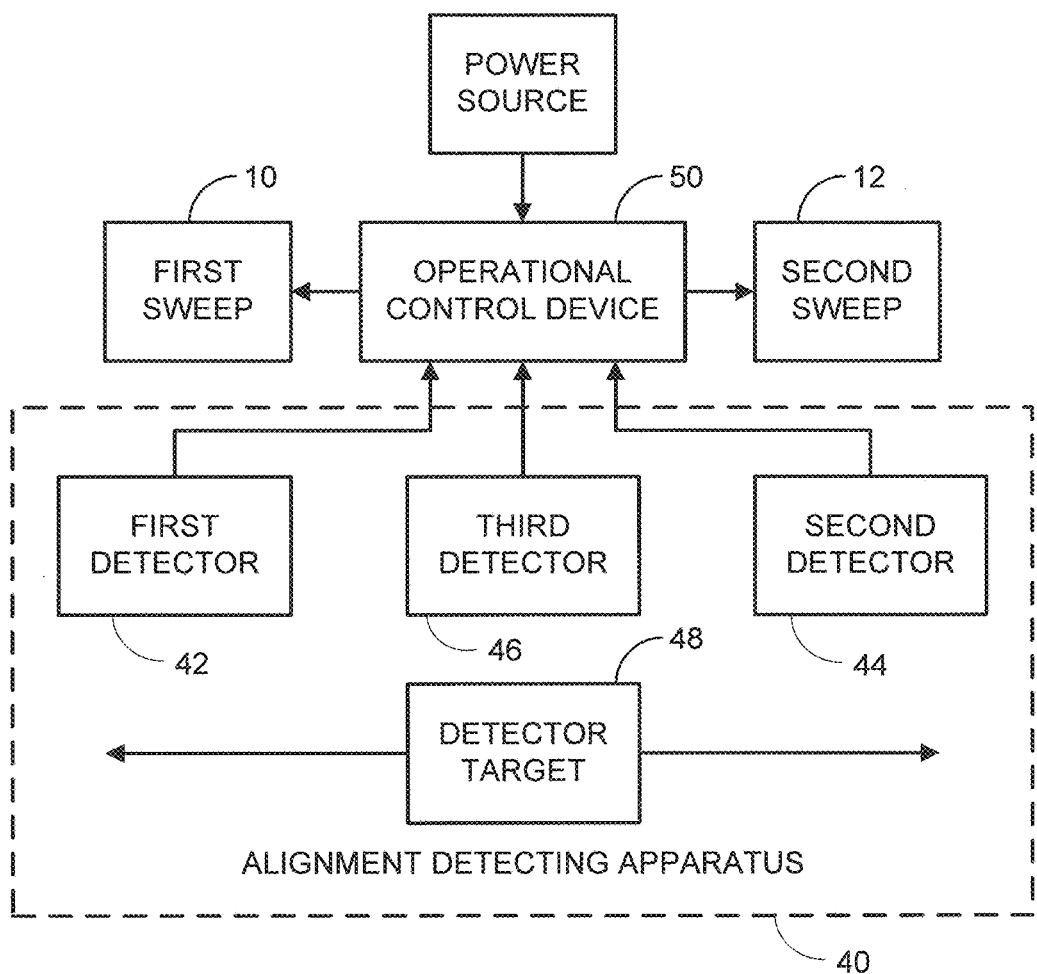
FIG. 7 is a schematic diagram of the bin sweep system, according to an illustrative embodiment.
Figure 8:
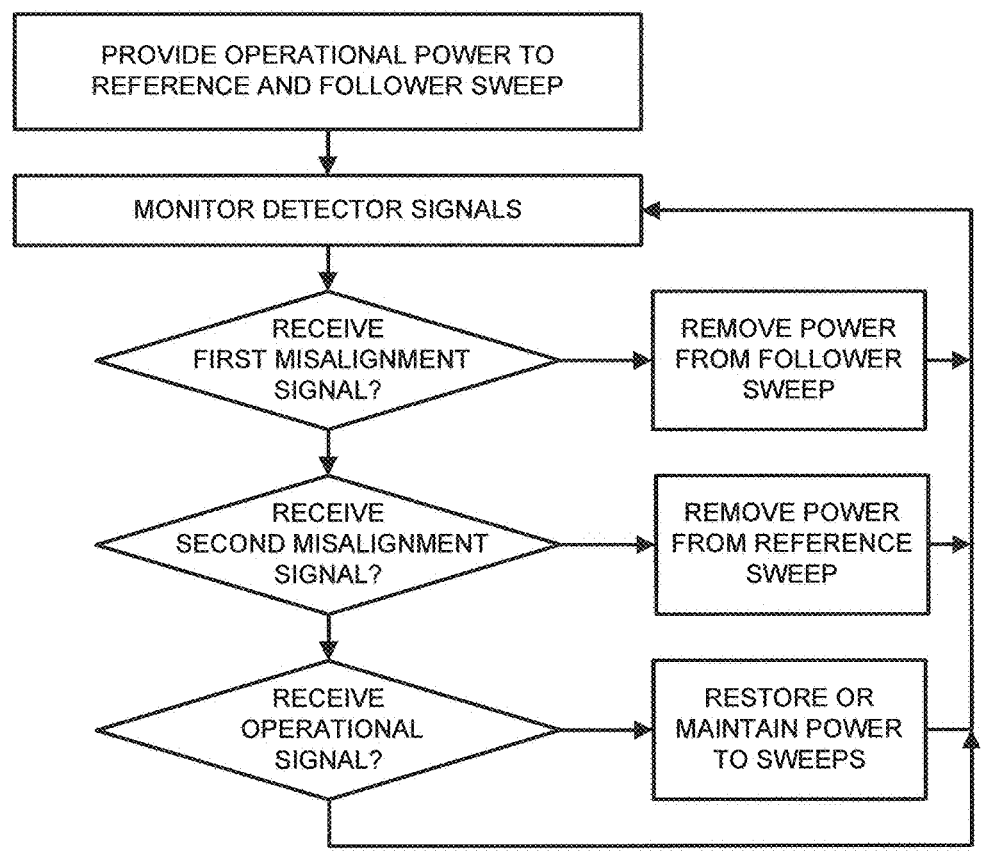
FIG. 8 is a schematic flow diagram of operational aspect of the system, according to an illustrative embodiment.
Figure 9:
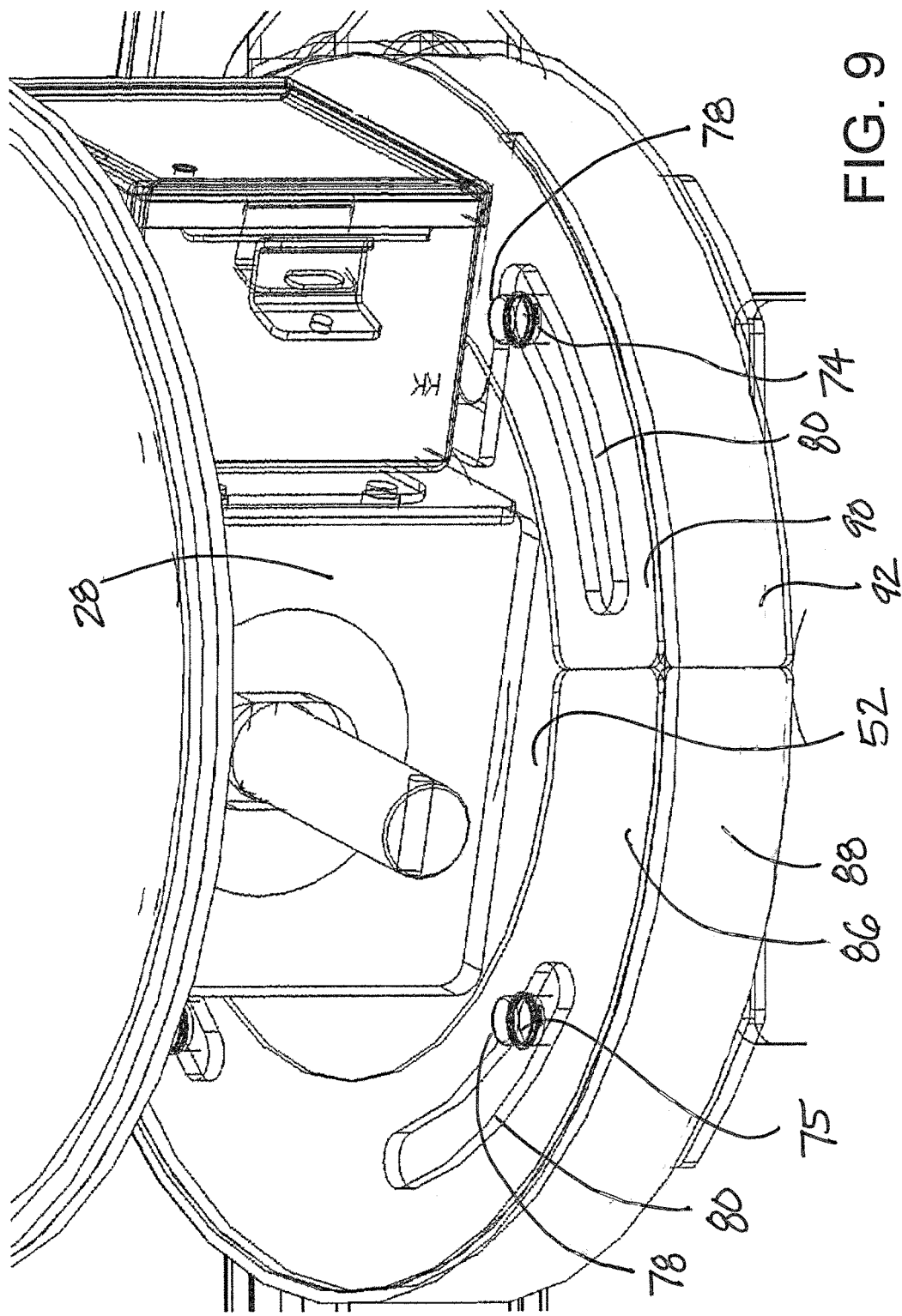
FIG. 9 is a schematic upper perspective view of an embodiment of the alignment detecting apparatus with parts removed from the sweep assembly to reveal detail of the detecting apparatus.
Figure 10:
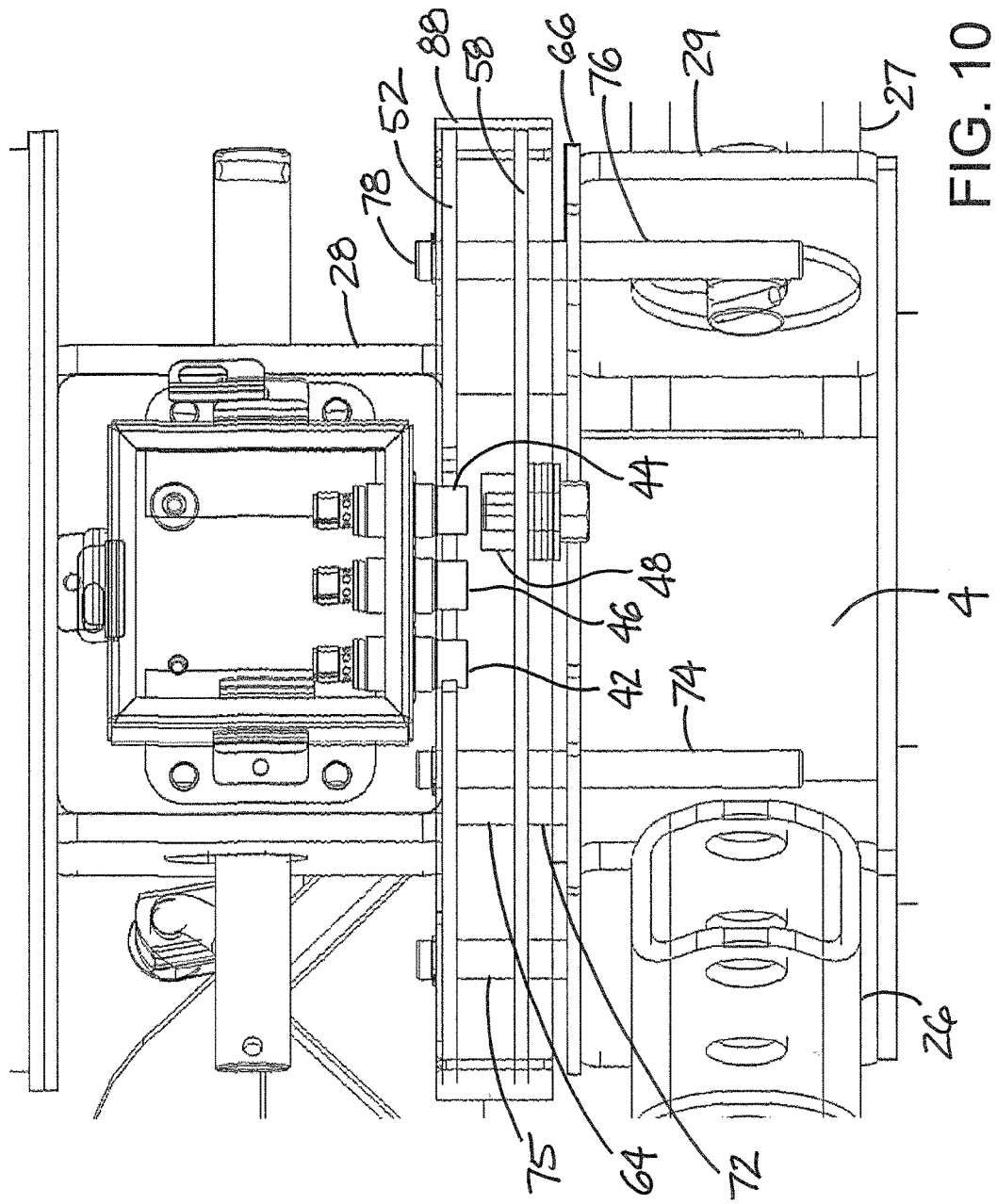
FIG. 10 is a schematic front side view of the embodiment of the alignment detecting apparatus with parts removed.
Figure 11:
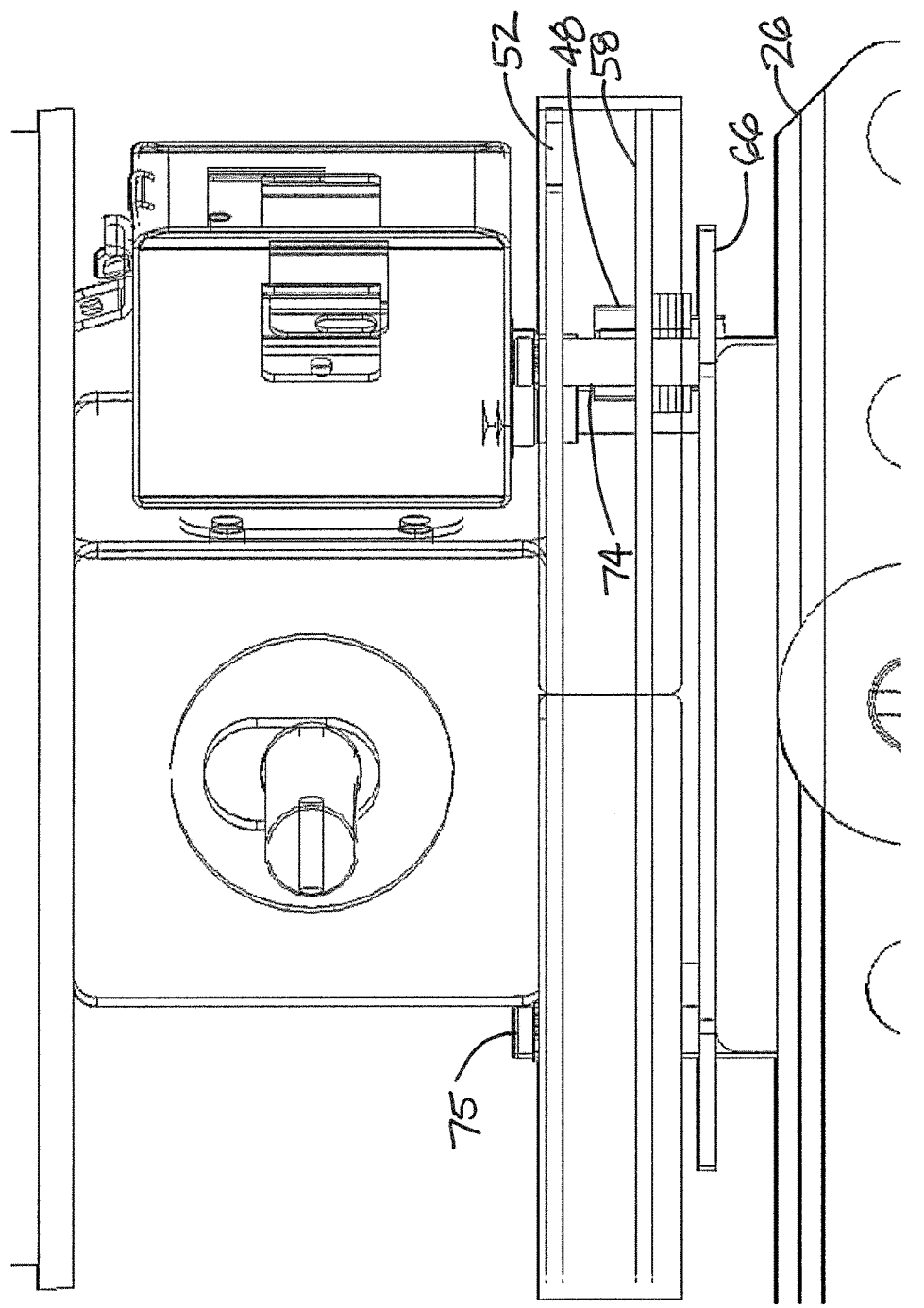
FIG. 11 is a schematic left side view of the embodiment of the alignment detecting apparatus with parts removed.
Figure 12:
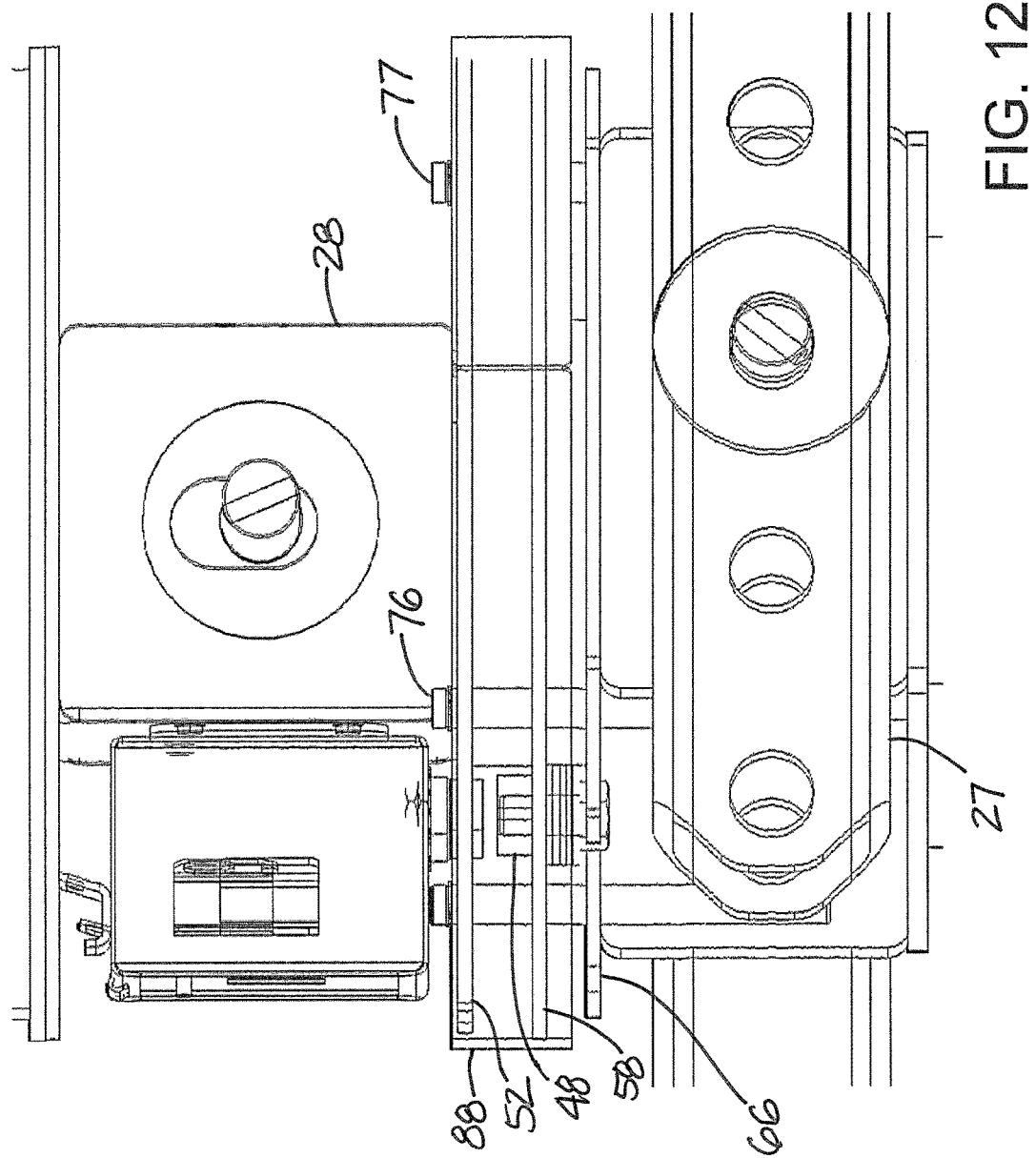
FIG. 12 is a schematic left side view of the embodiment of the alignment detecting apparatus with parts removed.
Figure 13:
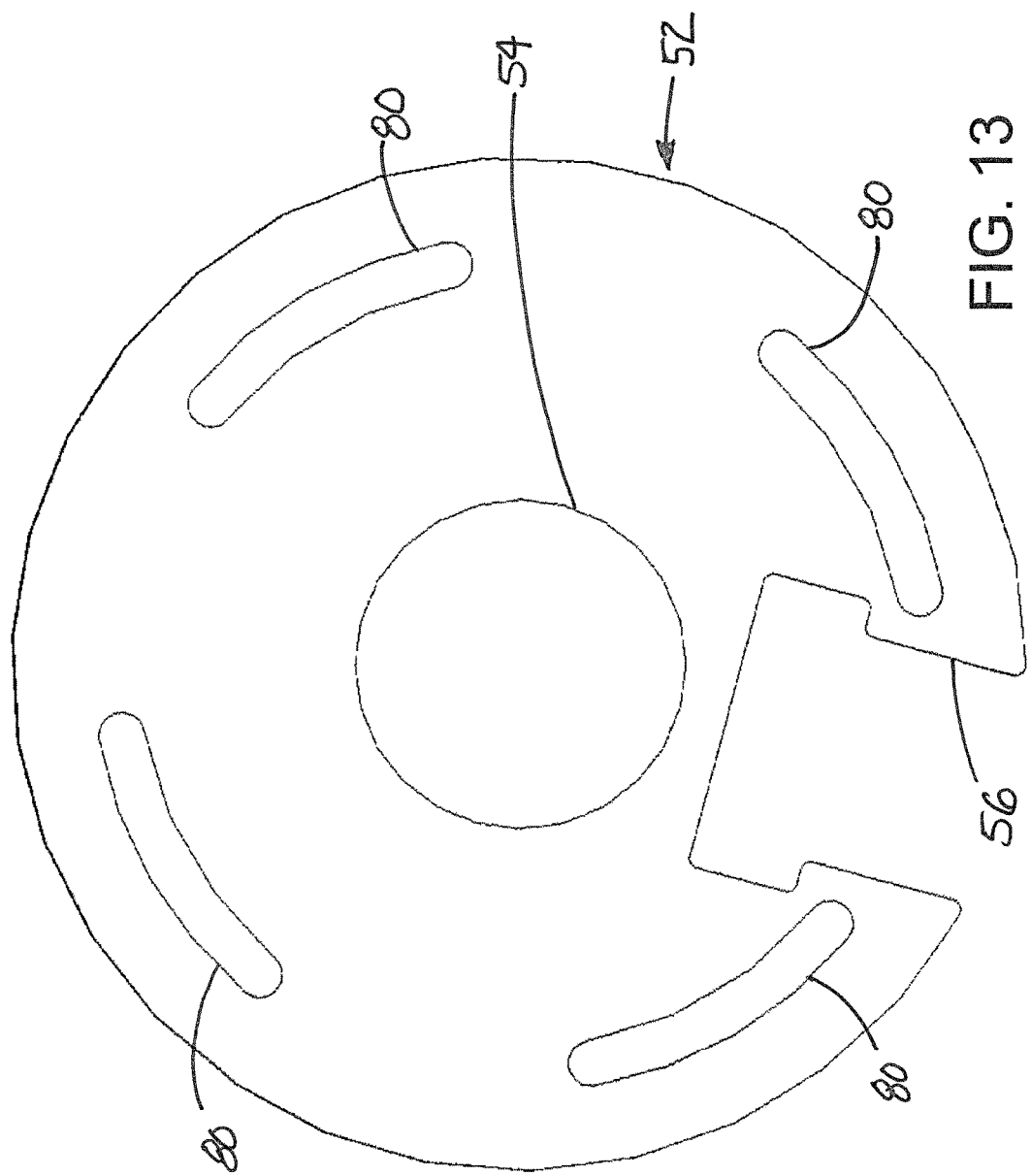
FIG. 13 is a schematic top view of an embodiment of the upper plate of the alignment detecting apparatus.
Figure 14:
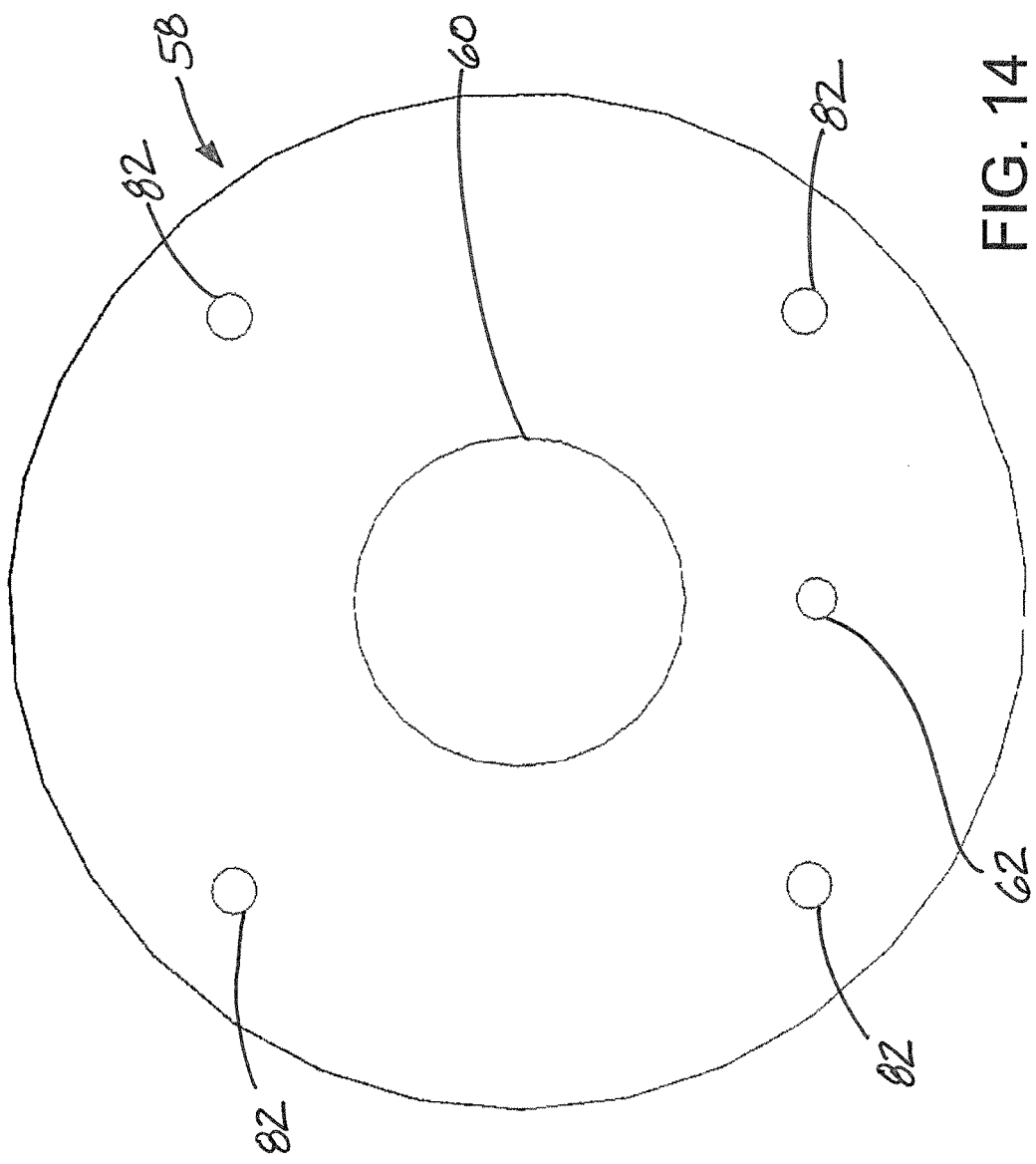
FIG. 14 is a schematic top view of an embodiment of the intermediate plate of the alignment detecting apparatus.
Figure 15:
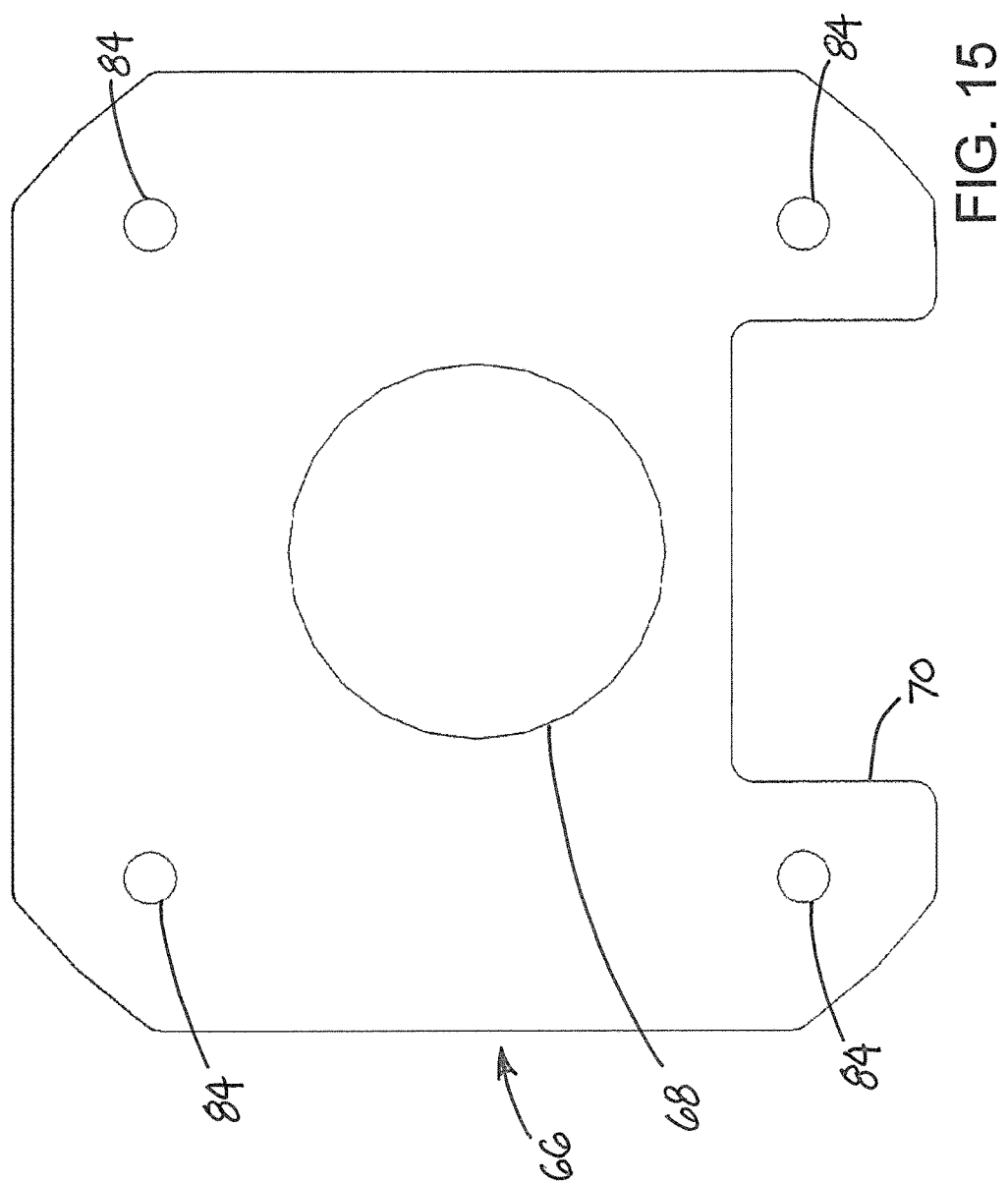
FIG. 15 is a schematic top view of an embodiment of the lower plate of the alignment detecting apparatus.

The multiple sweeps may have a trigger condition (such as depicted in FIG. 2) when the angle between the longitudinal axis of the reference sweep and the longitudinal axis of the follower sweep is not equal to, or substantially equal to, the maximum separation angle. In other words, the follower sweep in not in the operational zone and is outside of the zone (or on a border), which is generally a situation where the angle between the sweeps is less than desirable for maintaining safe operation. For example, the trigger condition may be caused by the follower sweep gaining on the reference sweep or lagging behind the reference sweep to a degree that the follower sweep does not remain in the operational zone.

In the illustrative embodiments, in which two sweeps are employed, the maximum angular separation is at approximately 180 degrees between the longitudinal axes of the sweeps, and the axes may be parallel to each other (and in some embodiments possibly even collinear). In some of the most preferred implementations, a precise separation of 180 degrees is not required to be maintained, and an operational zone is employed to extend to a predetermined deviation angle on either side of the maximum separation angle of 180 degrees. The number of degrees to which the zone extends on either side of the maximum separation angle may vary, but may be, for example, approximately 30 degrees or less on either side of the line of the maximum separation angle, and may be approximately 15 degrees or less. In some embodiments the zone may extend to approximately 8 degrees or less on each side of the line at 180 degrees.

Another aspect of the disclosure relates to an alignment detecting apparatus 40 for monitoring a relative position of the sweeps with respect to each other, which may form a part of the system 1. The alignment detecting apparatus 40 may be configured to detect if the follower sweep is positioned in the operational zone with respect to the reference sweep, or operating at or past one of the outer positions 32, 34 of the operational zone.

The alignment detecting apparatus 40 may comprise at least one detector mounted on one of the sweeps, such as for example the reference sweep, to move with the sweep, and in some of the most preferred embodiments at least two detectors may be employed. A first detector 42 may be associated with the first outer position 32, and a second detector 44 may be associated with the second outer position 34. In some embodiments, the detectors may be mounted to move with the reference sweep, which may be the first sweep of the illustrative embodiments. The first detector 42 may be mounted on the first support 28 of the first sweep and the second detector 44 may also be mounted on the first support, such as at a spaced location from the first detector. A third detector 46 may be employed, and may be mounted on the first support to move with the first sweep. The third detector 46 may be positioned between the first detector 42 and the second detector 44.

The alignment detecting apparatus 40 may also comprise at least one detector target 48 that is mounted to move with one of the sweeps to move with the sweep, and the sweep with the target may be the follower sweep. The detector target 48 may be mounted on the second support 29 of the second sweep 12. Alignment or substantial alignment, of one of the detectors with the target may cause the detector to generate a signal unique to that detector, and the signal may be utilized in a manner that will be described below.

In the illustrative embodiments, the detector target 48 may be substantially aligned with the third detector 46 when the longitudinal axes of the first and second sweeps are oriented at the maximum separation angle, or the follower sweep is in the operational zone. In the case of a bin sweep system 1 with only two sweeps, the third detector and the target may be substantially aligned when the axes of the first and second sweeps are substantially parallel. The detector target 48 may further be aligned, or substantially aligned, with the first detector 42 when the follower sweep is located at the first outer position 32 of the operational zone, and is thus rotated to the maximum deviation angle in the clockwise direction from the maximum separation angle position with respect to the reference sweep. The detector target 48 may be aligned or substantially aligned with the second detector 44 when the follower sweep is located in the second outer position 34 of the zone 30, and is thus rotated to the maximum deviation angle in the counter-clockwise direction from the maximum separation angle position with respect to the reference sweep.

The first detector 42 may generate a first misalignment signal when the detector target 48 is detected by the first detector, and the second detector 44 may generate a second misalignment signal when the detector target is detected by the second detector. The third detector 46 may generate an operational signal when the detector target is detected by the third detector.

An operational control device 50 may be configured to disable or pause movement of at least one of the sweeps under predetermined conditions (such as the trigger condition) which may be employed to cause the sweeps to move back toward a maximum separation condition. In some implementations, each of the sweeps has a drive system that may operate independently of any other sweep in the bin system, and may push the sweep forwardly to rotate the sweep about the center post. The drive system may be powered, for example, by an electric motor, and thus the supply and removal of the supply of power to the drive system may be employed to effectively control the movement of the sweeps independently of each other. The operational control device 50 may be in communication with the alignment detecting apparatus 40 for receiving signals from the detectors. The operational control device may also be in communication with the operational power supply for one or more of the sweeps so as to be capable of blocking or removing the supply of power from at least one of the sweeps to disable operation. The operational control device 50 may also be configured to restore power to at least one of the sweeps after removing power. The operation of the operational control device may be controlled by a program of instructions that set operational parameters based upon signals received from the detectors as well as other inputs. It should be recognized that the operational control device may be configured to cause movement of a sweep to be discontinued or paused without discontinuing the operation of any particle movement apparatus of the sweep, such as, for example, a plurality of paddles moving along the length of the sweep.

In some implementations, the operational control device 50 may be configured to remove power from components of the follower sweep when the operational control device receives the first misalignment signal from the first detector which corresponds to the follower sweep being at the first outer position (and while power is maintained to the reference sweep). Further, the operational control device may be configured to remove power from components of the reference sweep when the operational control device receives the second misalignment signal from the second detector which corresponds to the flower sweep being at the second outer position (and while power is maintained to the follower sweep). The operational control device may also be configured to restore or maintain power to the reference and follower sweeps when the operational control device receives the operational signal from the third detector which corresponds to the follower sweep being in the operational zone.

It should be appreciated that the arrangement of the detector and detector targets may be altered from the illustrative embodiments described herein and still achieve the desired functionality, In the illustrative embodiments, the detectors may comprise proximity sensors, and the detector target may comprise a proximity sensor target, although other types of sensor and sensing systems may be employed.

Optionally, one or more of the sweeps may have position sensors associated therewith which may be configured to indicate a location of the associated sweep in real time (or instantaneous) or at any suitable time interval. A communication system may be utilized to collect position data from the one or more position sensors, as well as operating temperature(s) of sweep components, operating capacity of the associated sweep, as well as other desired operating parameters. The data collected and transmitted via the communication system may be utilized to perform diagnostics for the system and the sweeps remotely from the bin, as well as adjusting the operational capacity of the sweep system.

An illustrative embodiment of the alignment detecting apparatus is shown in FIGS. 9 through 15, and facilitates the functionality of the detectors and targets even when the sweep assemblies move vertically with respect to each other at the center post (such as when the floor surface of the bin is uneven or inconsistent). The first support of the detecting apparatus may comprise an upper plate 52 that rotates with a first sweep 10 about the center post 4, and typically is mounted on the first sweep assembly. The upper plate 52 may be mounted to at least one of the collar 16 and the at least one connecting arm 24, 25 of the first sweep assembly. The upper plate 52 may have a central opening 54 for receiving the center post 4 therethrough, and may also have a notch 56 formed therein. In some embodiments, A portion of a housing for the detectors may be positioned in the notch 56.

The illustrative alignment detecting apparatus may also include an intermediate plate 58 may be positioned below the upper plate 52, and may have a central opening 60 that receives the center post 4 therethrough. The intermediate plate 58 may have a target aperture 62 for receiving a detector target 48. The detector target 48 may be mounted on the intermediate plate 58 such that movement of the intermediate plate about the center post moves the detector target about the post. A first spacer 64 may be positioned between the upper plate 52 and the intermediate plate 58 to space the upper plate from the intermediate plate and provide a minimum distance between the detectors and the detector target, although this is not critical.

The second support of the detecting apparatus may comprise a lower plate 66 that rotates with a second sweep 12 about the center post 4, and is typically mounted on the second sweep assembly. The lower plate 66 may be mounted to at least one of the collar 17 and the at least one connecting arm 26, 27 of the second sweep assembly. The lower plate may have a central opening 68 for receiving the center post 4. A notch 70 may also be formed in the lower plate 66, and may provide clearance for the detector target. A second spacer 72 may be positioned between the intermediate plate 58 and the lower plate 66 to space the intermediate plate from the lower plate, although this is not critical.

The detecting apparatus may also include at least one positioning pin for controlling some degree of relative movement of the plates. Although one positioning pin may be employed, a plurality of positioning pins are illustratively utilized, which may facilitate the distribution of stresses among more than a single pin. The illustrative embodiment utilizes four pins 74, 75, 76, 77. The positioning pins may extend through the upper plate 52, the intermediate plate 58, and the lower plate 66. The pins may have a head 78 located at upper ends of the pins to prevent movement of the pins through the upper plate.

The upper plate 52 may include at least one arcuate slot 80 that receives at least one pin, and a slot 80 may be provided for each of the pins utilized. The arcuate slot 80 may be configured to permit a degree of movement of the upper plate 52 relative to the pin when the upper plate rotates about the center post, so that movement of the pins does not necessarily require movement of the upper plate, and movement of the upper plate does not necessarily cause movement of the pins.

The intermediate plate 58 may include at least one hole 82 for receiving one of the pins. The hole 82 may be configured to resist movement of the intermediate plate relative to the pin when the intermediate plate rotates about the central axis, so that movement of the pin or pins about the center post causes movement of the intermediate plate. The hole 82 may be configured to permit the pin to freely slide through the hole. Suitably, the pins have sufficient length such that the pins remain in the holes 82 at the extreme vertical differential between the first and second sweeps assemblies at the center post.

The lower plate 66 may include at least one hole 84 for receiving one of the pins. The hole 84 may be configured to resist movement of the lower plate relative to the pin when the lower plate rotates about the central axis, so that movement of the pin or pins about the center post causes movement of the lower plate. The hole 84 may be configured to permit the pin to freely slide through the hole. Thus, the pins and the configuration of the holes 82, 84 and the slots 80 cause the lower and intermediate plates to rotate about the center post together (as a unit with the second sweep assembly) while the upper plate will only be cause to rotate if an extreme of the arcuate slots is reached by one of the pins. In many embodiments, the arc of the arcuate slots corresponds to the ac of the operational zone or may be slightly larger than the arc of the slot so that the pin may not reach the end of the slot.

As a preferred option, a first cover plate 86 may be positioned on the upper plate 52 to provide some degree of protection to the plates, and may have a semi-annular shape. A first skirt 88 may extend from an outer peripheral edge of the first cover plate, and may have a semi-cylindrical shape. Similarly, a second cover plate 90 may be positioned on the upper plate, and may also have a semi-annular shape and may be positioned in opposition to the first cover plate 86. A second skirt 92 may extend from an outer peripheral edge of the second cover plate, and may have a semi-cylindrical shape. The first 86 and second 90 cover plates may each have at least one hole for receiving one of the pins.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A bin sweep system for a bin having a floor surface and a substantially central well, the system comprising:
    a center post located at approximately a center of the bin;
    at least two sweeps connected to the center post to rotate generally independently about the center post to a plurality of rotational positions about the center post, the at least two sweeps including a first sweep with a first longitudinal axis and a second sweep with a second longitudinal axis, at least the second sweep having a rotation operational zone with respect to the first sweep, the operational zone being bounded by a first outer rotational position of the second sweep with respect to the first sweep and a second outer rotational position of the second sweep with respect to the first sweep;
    an alignment detecting apparatus configured to monitor a rotational position of the second sweep relative to the operational zone to detect rotational movement of the second sweep past the first outer rotational position or past the second outer rotational position and out of the operational zone;
    an operational control device in communication with the alignment detecting apparatus and being configured to discontinue movement of the first sweep or the second sweep when the alignment detecting apparatus detects that the second sweep moves past one of the outer rotational positions and out of the rotation operational zone;
    wherein the operational control device is configured to discontinue rotational movement of the second sweep when the alignment detecting apparatus detects that the second sweep has moved past the first outer rotational position and out of the rotation operational zone;
    wherein the operational control device is configured to selectively remove power from a drive system of at least one of the sweeps to discontinue movement of said at least one sweep; and
    wherein the operational control device is configured to selectively restore power to the drive system of said at least one sweep when the second sweep is effectively moved past one of the outer rotational positions and into the operational zone to continue movement of said at least one sweep after removing power.

2. The system of claim 1 wherein the alignment detecting apparatus is configured to detect if the second sweep is outside the operational zone with respect to the first sweep and detect if the second sweep is in the operational zone between the outer rotational positions with respect to the first sweep.

3. The system of claim 1 wherein the second sweep has a maximum separation condition at a maximum separation angle from the first sweep, the maximum separation angle being determined by a total number of sweeps of the system.

4. The system of claim 3 wherein the first outer rotational position of the second sweep is located at a first maximum deviation angle from the maximum separation condition, the second outer rotational position being located at a second maximum deviation angle from the maximum separation condition.

5. The system of claim 4 wherein the first maximum deviation angle is measured from the maximum separation condition in a clockwise direction and the second maximum deviation angle is measured from the maximum separation condition in a counterclockwise direction.

6. The system of claim 5 wherein the first and second maximum deviation angles are substantially equal.

7. The system of claim 1 wherein the operational control device is configured to discontinue movement of the first sweep or discontinue movement of the second sweep depending upon which of the outer rotational positions that the second sweep has moved past.

8. The system of claim 1 wherein the alignment detecting apparatus comprises a first detector being associated with the first outer rotational position and a second detector being associated with the second outer rotational position, the detectors being mounted to move with one of the sweeps, and at least one detector target being mounted on the other one of the sweeps to move with the other one of the sweeps.

9. The system of claim 8 wherein the detector target is substantially aligned with the first detector when the second sweep is substantially located at the first outer rotational position of the operational zone, the detector target being substantially aligned with the second detector when the second sweep is substantially located at the second outer rotational position of the operational zone.

10. The system of claim 9 wherein the first detector generates a first misalignment signal when the detector target is detected by the first detector and the second detector generates a second misalignment signal when the detector target is detected by the second detector, the alignment detecting apparatus being configured to communicate the first misalignment signal and the second misalignment signal to the operational control device.

11. The system of claim 10 wherein the operational control device is configured to remove power from the second sweep when the operational control device receives the first misalignment signal from the first detector and the operational control device is configured to remove power from the first sweep when the operational control device receives the second misalignment signal from the second detector.

12. The system of claim 1 wherein a rotational separation angle between the first outer rotation position and the second outer rotation position is approximately 30 degrees.

13. A bin sweep system for a bin comprising:
- at least two sweeps independently rotatable about a center of the bin to a plurality of rotational positions about the center;
- an alignment detecting apparatus for monitoring a rotational position of a first one of the sweeps relative to a rotational position of a second one of the sweeps; and
- an operational control device configured to selectively discontinue and resume movement of at least one of the sweeps to move the sweeps toward a maximum separation condition in which the respective rotational positions of the sweeps have a maximum rotation separation angle therebetween, the rotational position of a second said sweep corresponding to the maximum rotation separation angle relative to a first said sweep being in an operational zone;
- wherein the operational control device is configured to selectively remove power from a drive system of said at least one sweep when the alignment detecting apparatus detects that the second sweep has effectively moved out of an operational zone to discontinue movement of said at least one sweep; and
- wherein the operational control device is configured to selectively restore power to the drive system of said at least one sweep when the alignment detecting apparatus detects that second sweep has effectively moved into the operational zone to continue movement of said at least one sweep.

14. A bin sweep system for a bin having a floor surface and a substantially central well, the system comprising:
- a center post located at approximately a center of the bin;
- at least two sweeps connected to the center post to rotate generally independently about the center post to a plurality of rotational positions about the center post, the at least two sweeps including a first sweep with a first longitudinal axis and a second sweep with a second longitudinal axis, at least the second sweep having a rotation operational zone with respect to the first sweep, the operational zone being bounded by a first outer rotational position of the second sweep with respect to the first sweep and a second outer rotational position of the second sweep with respect to the first sweep;
- an alignment detecting apparatus configured to monitor a rotational position of the second sweep relative to the operational zone to detect rotational movement of the second sweep past the first outer position or past the second outer position and out of the operational zone; and
- an operational control device in communication with the alignment detecting apparatus and being configured to discontinue movement of at least one of the sweeps when the second sweep moves past one of the outer positions and out of the operational zone;
- wherein the operational control device is configured to discontinue rotational movement of the second sweep when the alignment detecting apparatus detects that the second sweep has moved past the first outer rotational position and out of the rotation operational zone;
- wherein the operational control device is configured to discontinue rotational movement of the first sweep when the alignment detecting apparatus detects that the second sweep has moved past the second outer rotational position and out of the rotation operational zone;
- wherein the operational control device is configured to selectively remove power from a drive system of at least one of the sweeps to discontinue movement of said at least one sweep; and
- wherein the operational control device is configured to selectively restore power to the drive system of said at least one sweep when the second sweep is effectively moved past one of the outer positions and into the operational zone to continue movement of said at least one sweep after removing power.

\* \* \* \* \*